ary Examiner—Mark O. Budd

United States Patent [19]
Inagaki et al.

[11] 4,201,930
[45] May 6, 1980

[54] AC GENERATOR HAVING A CLAWTOOTH ROTOR WITH IRREGULAR TRAPIZOIDAL TEETH

[75] Inventors: Mitsuo Inagaki, Okazaki; Yoshiyuki Hattori, Toyoake; Masahiro Taguchi, Nishio, all of Japan

[73] Assignee: Nippon Soken, Inc., Nishio, Japan

[21] Appl. No.: 922,851

[22] Filed: Jul. 7, 1978

[30] Foreign Application Priority Data

Jul. 15, 1977 [JP] Japan ................................. 52-85466

[51] Int. Cl.² .......................... H02K 5/24; H02K 1/22
[52] U.S. Cl. ...................................... 310/51; 310/263
[58] Field of Search .................. 310/51, 105, 261, 263

[56] References Cited

U.S. PATENT DOCUMENTS

| 3,032,670 | 5/1962 | Fritz .................................. 310/263 X |
| 3,714,484 | 1/1973 | Habert .................................. 310/263 |

FOREIGN PATENT DOCUMENTS 1932641  1/1971  Fed. Rep. of Germany ........... 310/263

*Primary Examiner*—Mark O. Budd
*Attorney, Agent, or Firm*—Cushman, Darby & Cushman

[57] ABSTRACT

A polyphase AC generator of a type designed for installation in automobiles, has a so-called Lundell type rotor in which an exciting coil is enclosed by a plurality of pairs of finger type magnetic poles and which is rotated by a vehicle-mounted engine. The shape of the finger magnetic poles is modified to an irregular trapezoidal shape having a side opposite to a base displaced with respect to said base in the direction of rotation of the rotor, thus changing the waveform of magnetic flux flowing through the rotor and an armature core and thereby reducing magnetic noise of the generator under load operation.

2 Claims, 10 Drawing Figures

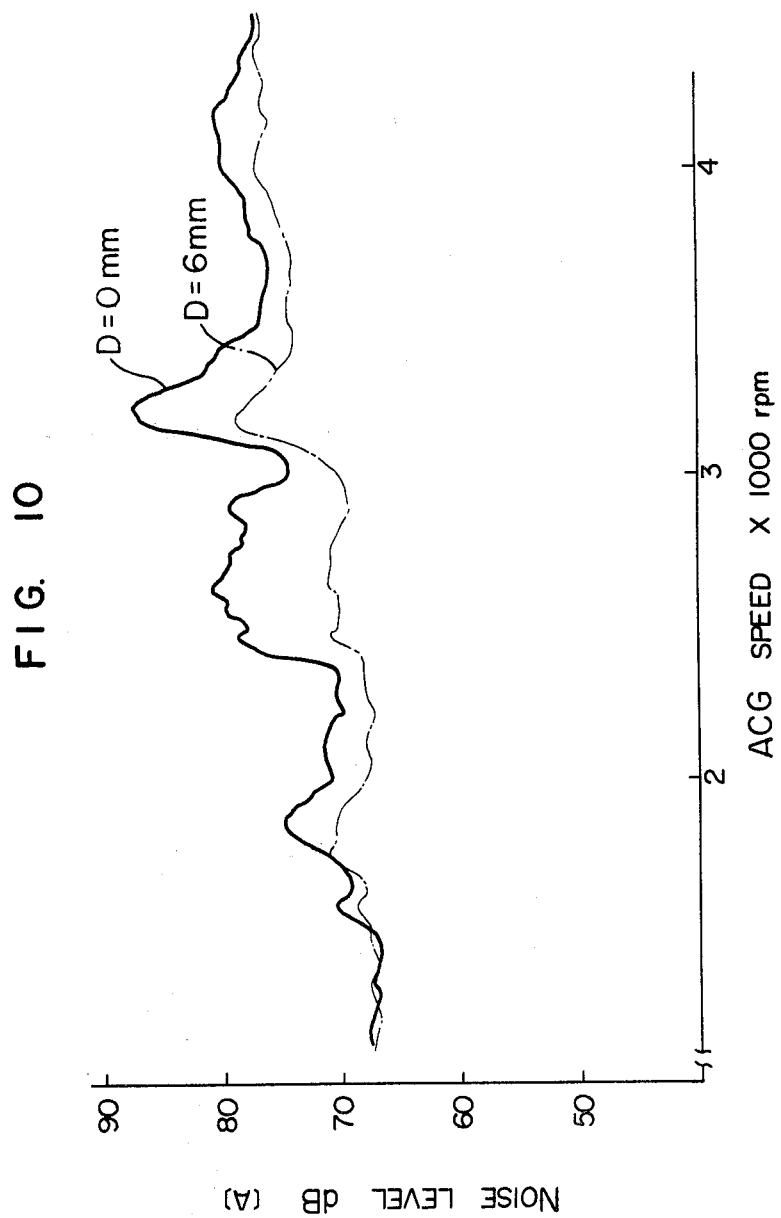

AC GENERATOR HAVING A CLAWTOOTH ROTOR WITH IRREGULAR TRAPIZOIDAL TEETH

The present invention relates to AC generators for vehicles, and more particularly the invention relates to a multiphase, particularly three-phase AC generator which is designed principally for use in vehicles and in which the rotor driven by a vehicle-mounted engine is in the form of a so-called Lundell type rotor consisting of an exciting coil enclosed by a plurality of pairs of finger magnetic poles.

FIG. 10 shows a comparison of total noise under full-load operation of the prior art generator and the generator of this invention.

Figure 1:
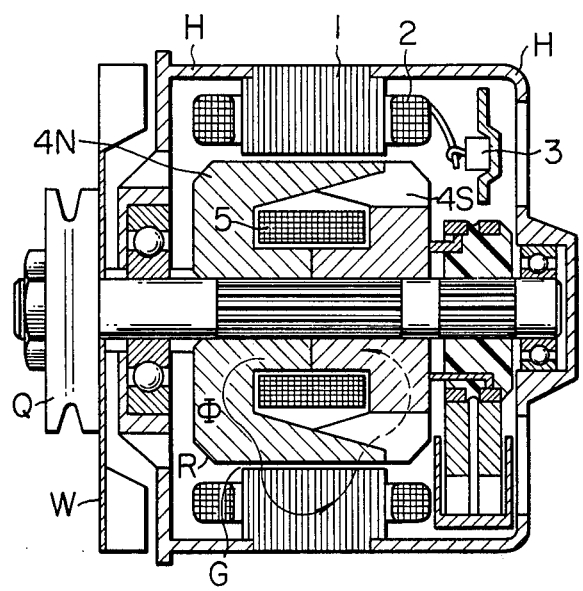
FIG. 1 is a longitudinal sectional view of a prior art AC generator.

As is well known in the art, known three-phase AC generators (hereinafter simply referred to as ACG's) of the above type are generally constructed basically as shown in FIG. 1.

In the Figure, numeral 1 designates an armature core of a cylindrical shape, and 2 three-phase armature windings wound around the core 1. The armature assembly comprising these elements is contained between two housings H. Numeral 3 designates a three-phase full-wave rectifier unit contained in one of the housings H for converting the output of the armature windings 2 into DC current. A Lundell type rotor R is rotatably mounted on a shaft within the housings H and it is driven through a belt and a pulley Q from the crankshaft of an engine which is not shown. The rotor R comprises a plurality of pairs of finger magnetic poles 4N and 4S which are opposed to and spaced from the armature core 1 by a small gap G and a cylindrical exciting coil 5 which is enclosed by these magnetic poles so as to energize the same to opposite polarities. Symbol W designates cooling fans.

When exciting current flows to the exciting coil 5, the magnetic poles 4N and 4S are energized to opposite polarities to each other (the affixes N and S indicate the polarities) and a magnetic flux $\Phi$ flows to the armature core 1.

Figure 2:
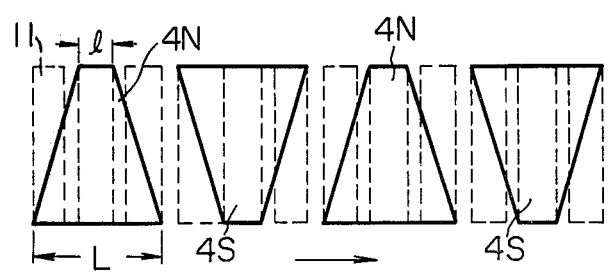
FIG. 2 is a development view of the surface of the finger magnetic poles of the prior art generator.

Generally, in this type of ACG the face of the magnetic poles 4N and 4S opposite to the armature core 1 has an equilateral trapezoidal shape as shown in FIG. 2 when it is developed in a plane. In the Figure, numeral 11 indicates the teeth of the armature core 1.

Also, in the case of the prior art generator with the finger magnetic poles 4N and 4S which are shaped as shown in FIG. 2, it is considered proper and efficient from a point of electromagnetics to select the equilateral trapezoid base length L slightly smaller than the pole pitch and to select the equilateral trapezoidal top length l equal to the width of the teeth 11 of the armature core 1 to provide one-slot skew, and this one-slot skew rate is also considered to have the effect of reducing magnetic vibration noise.

With the above-described ACG, however, the magnetic sound produced under load operation is treated as abnormal sound (noise) in the relatively low speed ranges.

Such magnetic sound is inherently caused during the periods of load operation and it has been known that the magnetic sound is caused by the fact that the Lorentz's force due to magnetic flux variation caused by the reaction of the armature acts as an exciting force between the finger magnetic poles and the armature core thus causing the armature core, the housings, etc., to vibrate.

The inventor, etc., have made every and utmost efforts as well as many experiments and studies to realize a reduction in the magnetic noise, and the inventor has successfully completed the present invention as will be described in greater detail hereunder.

With the experiments conducted by the inventor, the frequency analysis of the magnetic sound has shown that if P is the number of poles of the finger magnetic poles, the frequency of the sound which will be considered to be an objectionable noise is a component that is 6P times the number of revolutions of the ACG (in effect, 36 times since P=6 in the ordinary ACG).

As a result, in view of the fact that such magnetic sound is of a special kind which occurs during the periods of load operation, the phenomena appearing under the load operation have been carefully studied.

Figure 3:
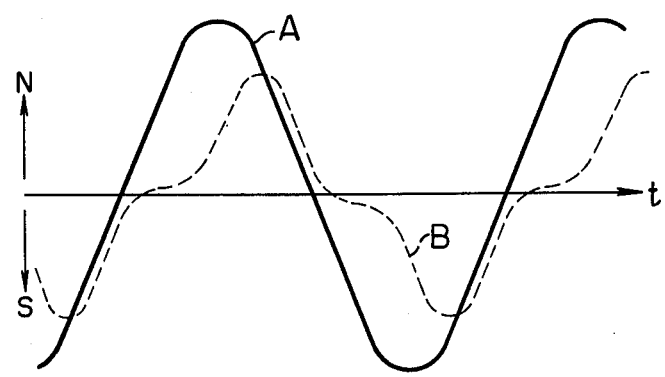
FIGS. 3 and 4 are magnetic flux waveform diagrams of the prior art generator.
Figure 4:
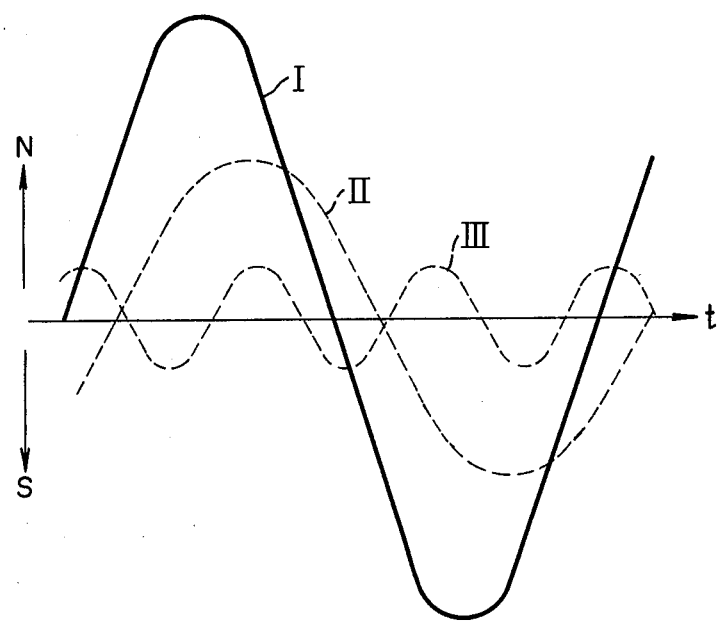

In the case of the prior art ACG shown in FIG. 1, when exciting current flows in the exciting coil 5, magnetic flux $\Phi$ flows through the teeth 11 of the armature core 1. In this condition, when the rotor R and hence the finger magnetic poles 4N and 4S are rotated in the direction of the arrow shown in FIG. 2 so as to observe the resulting variation in the magnetic flux flowing through the teeth 11 of the armature core 1, a sinusoidal waveform as shown by a solid line A in FIG. 3 will be obtained (this condition is hereinafter referred to as an excited no-load condition). Thereafter, when a load resistance is connected to the output terminal of the ACG (this is hereinafter referred to as a load condition), current flows to the armature windings 2 wound around the armature core 1. This current causes a counter electromotive force which in turn causes the magnetic flux flowing through the teeth 11 of the armature core 1 to vary like the distorted waveform shown at a broken line B in FIG. 3. In FIG. 4, a solid line I and broken lines II and III respectively show the waveforms obtained by subjecting the magnetic variation waveform A under no-load condition and the magnetic flux variation waveform B under load condition to Fourier transformation. As will be seen from the Figure, as compared with the magnetic flux variation I under excited no-load condition, during the load condition the level of the solid line I decreases as indicated by the broken line II and there is newly produced frequency component III which is 3 times the frequency components I and II. In this case, the frequency of the components I and II is a frequency N.P representing the product of the number of revolutions N of the ACG and the number of poles P of the finger magnetic poles 4N of the ACG (this number is the same for the finger magnetic poles 4S). Consequently, the frequency III is given by 3NP. The Lorentz's force F (exciting force) due to the magnetic flux Φ has a relation F∝Φ², and consequently the teeth 11 of the armature core 1 are subjected to the Lorentz's force F in the direction of the magnetic poles.

Since the variations of the magnetic flux Φ involve the frequency components N.P and 3N.P as mentioned previously, if Φ=A sin 2π.NPt+B sin 2π.3NPt, for example, the Lorentz's force F is proportional to the following;

$$\Phi^2 = \frac{1}{2}(A^2 + B^2) - (\frac{A^2}{2} - AB)\cos 2\pi \cdot$$
$$2NPt - AB \cdot \cos 2\pi \cdot 4NPt - \frac{B^2}{2} \cos 2\pi \cdot 6NPt$$

and the resulting exciting force F' contains frequency components 2N.P, 4N.P and 6N.P.

In practice, it is presumed that the component 6N.P coincides with the natural frequency of the ACG thus causing magnetic noise.

As will be seen from the above equations, the component 6N.P of the exciting force is caused by the component 3N.P of the magnetic flux variation.

It has been discovered from the foregoing that if the component 3N.P of the magnetic variation is reduced, the component 6N.P of the exciting force will be reduced thus reducing the magnetic noise.

It has been noted that the magnetic flux variation waveform under excited no-load condition may be caused to take a special form as a means of minimizing the frequency component 3N.P of the magnetic variation waveform under load condition. In other words, the waveform may be subjected to Fourier transformation so as to be distorted as shown by a solid line C in FIG. 5 with respect to the conventional waveform (the sinusoidal waveform I indicated by the broken line) so that the frequency component 3N.P (the broken line II) is present in opposite phase to the frequency component 3N.P of the prior art ACG under load operation, thus causing the magnetic flux variation waveform under load condition to distort as if it takes the form of sinusoidal waveform. The present invention has been made on the basis of the abovementioned concept.

It is therefore an object of the present invention to provide a polyphase AC generator having an improved rotor pole structure which is capable of greatly reducing magnetic noise without reduction in output.

Figure 5:
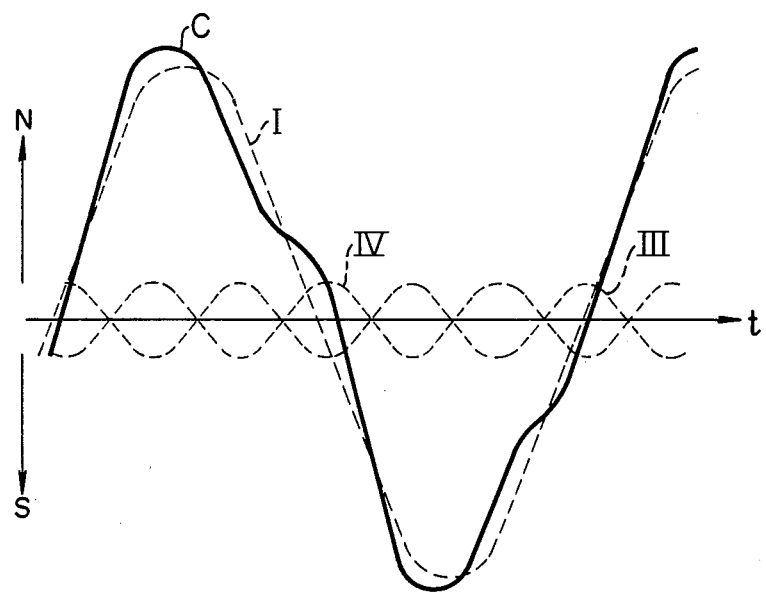
FIG. 5 is a diagram showing the magnetic flux waveforms of the prior art generator and the generator of this invention.

It is another object of the invention to provide improved finger magnetic poles of a shape selected in consideration of easiness of manufacture and assemblage, compatibility with the prior art ACG, etc., and capable of generating the magnetic flux waveform C shown in FIG. 5.

Thus, in accordance with the present invention, the finger magnetic poles are each so shaped that while the face of each magnetic pole facing the armature core is basically trapezoidal in shape, it has an irregular trapezoidal shape with the side opposite to the base being displaced with respect to the later in the direction of rotation of the rotor.

With the construction described above, the AC generator of this invention is capable of greatly reducing the magnetic flux without any reduction in output as will be described in greater detail hereunder.

Figure 6:
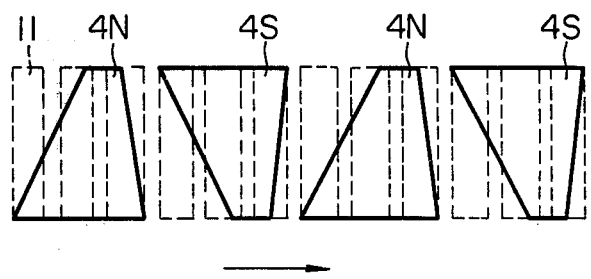
FIG. 6 is a development view of the magnetic pole surface which is typical of the finger magnetic poles used with the invention.

Referring to FIG. 6 showing an exemplary planar shape of the face of finger magnetic poles 4N and 4S according to the invention disposed to face an armature core, each of the finger magnetic poles 4N and 4S has an irregular trapezoidal shape which is basically trapezoidal and having the opposite side displaced with respect to the base in the direction of the arrow (in the direction of rotor rotation).

Figure 7:
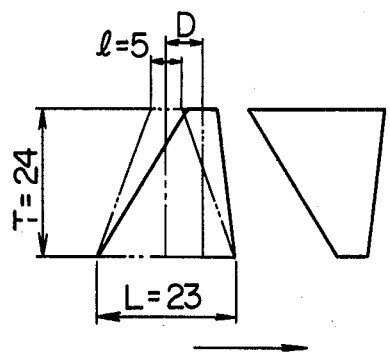
FIG. 7 is a diagram showing the dimensions of the finger magnetic poles used with the invention.

Assume now that the ACG has a basic physical construction so that the inner diameter of its armature core 1 is 97 mm, slot pitch is 8.5 mm, the outer diameter of its rotor R (the outer diameter of finger magnetic poles 4N and 4S) is 96.4 mm and that the finger magnetic poles 4N and 4S with the number of poles P=6 are of the standard type each having a pole surface specification shown in FIG. 7, that is, the height of trapezoid T (substantially equal to the axial width of the armature core 1)=24 mm, base length L=23 mm which is about three times as long as the slot pitch and top length l=5 mm, then, as shown in FIG. 7, the pole surface shape (the solid line) according to the invention has an irregular trapezoidal shape in which the top is displaced by an amount D with respect to the base in the direction of the arrow (the direction of rotation) as compared with the conventional pole surface shape (the two-dot chain line).

Figure 8:
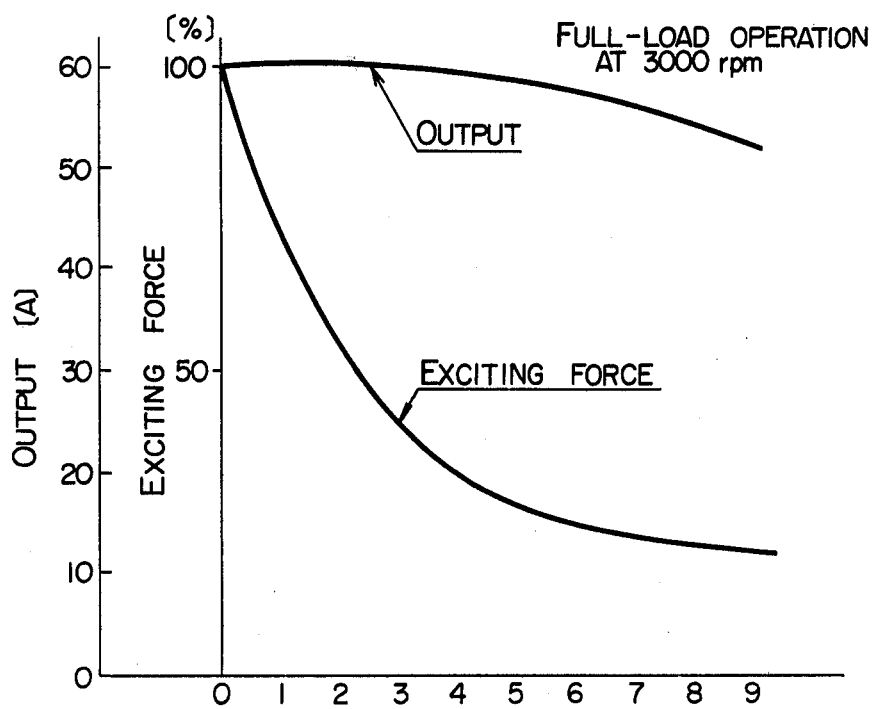
FIGS. 8 and 9 are characteristic diagrams showing comparative performances of the prior art generator and the generator of this invention.

FIG. 8 shows the measured results of the variations in the ACG output and exciting force obtained by changing the amount of displacement in various ways. The Figure shows the characteristics under the full-load condition with N=3,000 rpm, with the ordinate representing the measured values of output (A) and the rates of exciting force taking that of the prior art ACG as 100% and the abscissa representing the amount of displacement D (mm).

As will be seen from FIG. 8, throughout the range of D=1 to 9 mm, the exciting force decreased considerably from 75 to 20%, although the output changed from 60 to 52 A showing a slight falling tendency in the output.

Particularly, in the range of D=2 to 6 mm, that is, in the range where the ratio of D to the slot pitch=8.5 mm is in the range 0.2 to 0.7, the output showed practically no decrease and the exciting force was decreased greatly thus showing that a remarkable effect is obtainable in this particular range.

Figure 9:
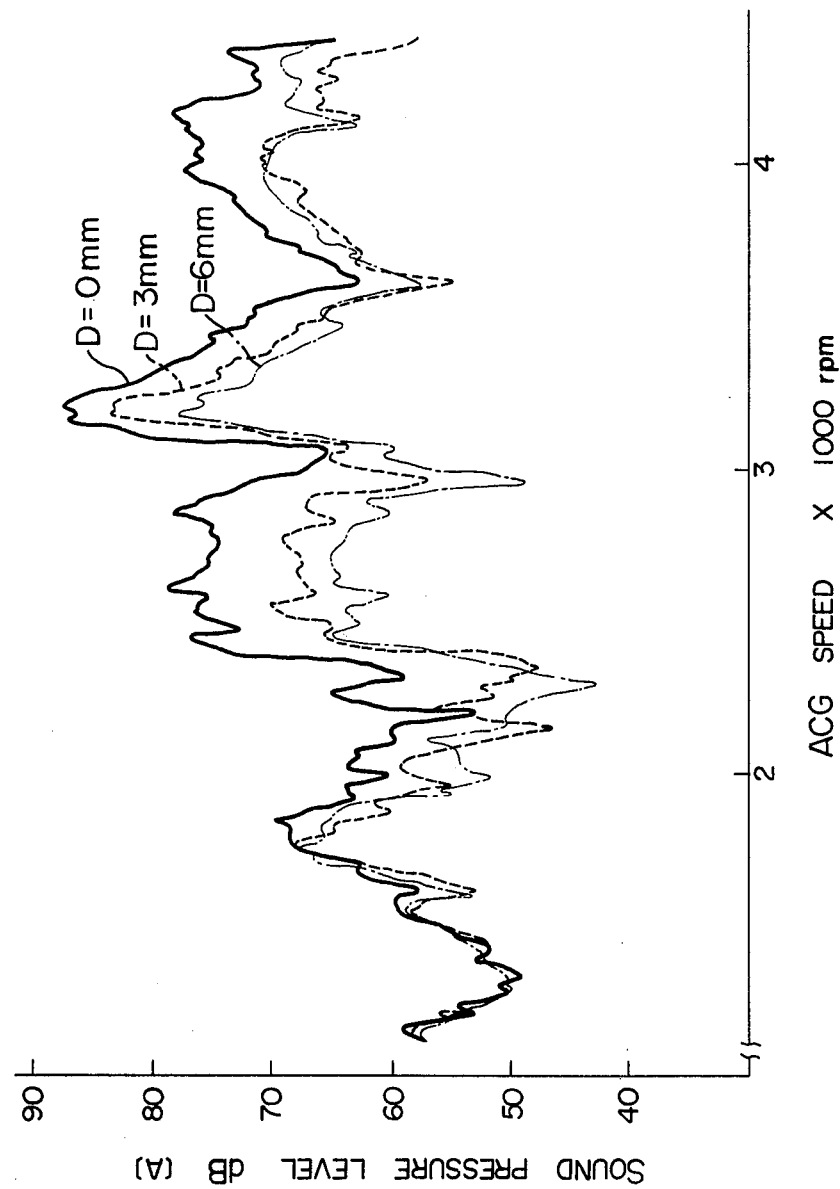

Referring now to FIG. 9, there is shown that this decreased exciting force has the effect of positively reducing the sound pressure level dB (A) of the frequency component (6N.P) of the objectionable sound (noise) in the magnetic sounds.

In the Figure, the curve D=0 mm (the solid line) represents the sound pressure level of the prior art ACG, and the sound pressure level of the ACG according to the invention was lower by as much as 10 dB (A) in the low speed range of 2,000 to 4,000 rpm as shown by two exemplary cases of D=3 mm (the broken line) and D=6 mm (the one-dot chain line).

Thus, in accordance with the present invention, it is possible to considerably reduce the magnetic noise without appreciably reducing the output.

With the present invention, it is essential that the modified shape of the finger magnetic poles 4N and 4S does not newly give rise to any magnetic noise.

FIG. 10 shows a comparison of the total noise produced under the full-load operation by the ACG (D=6 mm) of the invention with that of the prior art ACG (D=0 mm). As will be seen from the Figure, as compared with the prior art ACG, the total noise produced by the ACG of this invention was decreased in conformity with FIG. 9. Consequently, it has been confirmed that the modified shape of the finger magnetic poles has the effect of greatly reducing only the magnetic noise without newly giving rise to any magnetic noise.

While, in the embodiment described above, the finger magnetic poles 4N and 4S are each formed into a perfect unequal-sided trapezoidal shape, it is a matter of course that any changes and modifications in shape which are matters of choice, such as, to arcuate all the corners, to arcuate the substenses, to make non-linear the inclined side connecting the subtenses and so on, all fall within the scope of the unequal-sided trapezoidal shape defined according to the invention so far as these changes and modifications do not depart from the scope of the invention.

It will thus be seen that the present invention has a great advantage that the production of magnetic noise can be greatly reduced without appreciably reducing the output by virtue of the fact that the finger magnetic poles are each so shaped that the surface facing the armature core has an irregular trapezoidal shape with the upside being displaced with respect to the base in the direction of rotation. The present invention also has utility in that the finger magnetic poles are compatible with the prior art ACG since they are simply modified in shape and that the fact of the finger magnetic poles being essentially trapezoidal in shape makes it easy to manufacture the finger magnetic poles themselves by forging.

We claim:

1. In an AC three-phase generator including an armature core having a plurality of teeth arranged with a predetermined slot pitch, a plurality of three-phase armature windings wound on said armature core and a rotor disposed to face said armature core with a small gap therebetween and having at least one pair of finger magnetic poles disposed to be energized to opposite polarities, the improvement wherein each of said finger magnetic poles has its surface facing said armature core formed into an irregular trapezoidal shape having a base of about three times as wide as said slot pitch and a side opposite to said base, said base and said side having center points, the center points of said side displaced with respect to the center point of said base in the direction of rotation of said rotor, the ratio of the displacement of said side to said predetermined slot pitch being in the range of 0.2 to 0.7.

2. An AC generator according to claim 1, wherein said opposite side of each said finger magnetic pole is equal in width with said tooth of said core.

* * * * *